United States Patent
Kotzsch et al.

[11] 3,869,340
[45] Mar. 4, 1975

[54] PHOSPHORUS ORGANOSILANE ADHESIVES

[75] Inventors: Hans-Joachim Kotzsch, Rheinfelden; Jurgen Amort; Hans Junger, both of Troisdorf; Heinz Nestler, Niederkassel; Franz Weissenfels, Siegburg, all of Germany

[73] Assignee: Dynamit Nobel Aktiengesellschaft, Troisdorf, Germany

[22] Filed: Oct. 27, 1972

[21] Appl. No.: 301,700

[30] Foreign Application Priority Data
Nov. 3, 1971  Germany.......................... 2154590

[52] U.S. Cl. ............... 161/182, 161/191, 161/193, 161/206, 161/207, 161/208, 161/213, 260/448, 260/8 R, 260/444.2 N, 260/606.5 P, 117/126 GS, 156/329
[51] Int. Cl. ........................ B32b 9/04, B32b 17/06
[58] Field of Search ....... 161/207, 208, 191, 1, 206, 161/193, 213, 182; 260/448.8 R, 448.2 N, 605.5 P, 45.7 P, 465 E; 156/329; 117/126 GS

[56] References Cited
UNITED STATES PATENTS

| | | | |
|---|---|---|---|
| 3,022,196 | 2/1962 | Jenkins et al. | 156/329 |
| 3,067,229 | 12/1962 | Fekete | 260/448.8 R |
| 3,122,581 | 2/1964 | Pike | 260/45.7 P |
| 3,197,431 | 7/1965 | Lanham et al. | 260/448.2 N |
| 3,414,463 | 12/1968 | Jasinski | 161/207 |
| 3,416,950 | 12/1968 | Schrader | 117/106 |
| 3,585,103 | 6/1971 | Thomson | 161/208 |
| 3,783,001 | 1/1974 | Marzocchi | 117/126 GB |

*Primary Examiner*—George F. Lesmes
*Assistant Examiner*—Stanley S. Silverman
*Attorney, Agent, or Firm*—Burgess, Dinklage & Sprung

[57] ABSTRACT

A method for adhering an organic substance to a metallic or inorganic oxidic substance which comprises disposing between said organic substance and said metallic or inorganic oxidic substance a phosphorus organosilane of the general formula

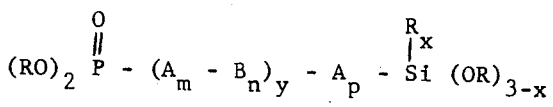

wherein each R is independently a substituted or unsubstituted aliphatic radical, each A is a bivalent alkylene or arylene radical or a bivalent oxyalkylene or oxyarylene radical joined by its oxygen to the phosphorus atom, $m$, $n$, $p$ and $x$ are each values of 0 or 1, B is either a bivalent oxygen radical, an —NH— radical, an —NR— radical or an —S— radical when $p$ is equal to 1 and $y$ is equal to 1 to 20.

6 Claims, No Drawings

PHOSPHORUS ORGANOSILANE ADHESIVES

BACKGROUND OF THE INVENTION

1. Field of the Invention

This invention is directed to a method for adhering organic substances, especially of a polymeric type, to inorganic substances which represent either an inorganic oxidic surface or a metallic surface. More particularly, this invention is directed to the use of certain phosphorus organosilanes as adhesive agents between organic polymeric surfaces and substances having inorganic, oxidic and/or metallic surfaces. This invention is especially directed to the use of phosphorus organosilanes to form formed objects comprising an organic polymeric substance and an inorganic oxidic or metallic substance.

2. Discussion of the Prior Art

It is known to coat fibers or fabrics of glass or metal sheets with a large variety of organic polymers, applying them to one or both sides, and in this manner to make laminates or sandwiches of these materials. Good adhesion between the organic and the inorganic components, however, cannot be achieved without adhesives, because the adhesion between the interfaces of the two components without the other adjuvants is not sufficient to achieve the mechanical characteristics required of construction materials. Furthermore, adhesion between inorganic substances such as glass or metal diminishes under the long-term action of moisture, so that repeated attempts have been made to overcome this deficiency of the bond with adjuvant materials. For example, German Pat. No. 1,010,941 describes the pretreatment of oxidic material with organic silicon compounds containing vinyl radicals. German Auslegeschrift No. 1,242,358 proposes for this purpose the use of organic silicon compounds containing amino groups. For many applications, however, the strength of adhesion achieved with these adhesives is insufficient, or the transparency is inadequate, especially in the case of glass laminates.

SUMMARY OF THE INVENTION

Broadly, this invention contemplates a method for adhering an organic polymeric substance to a substance presenting an inorganic oxidic surface or a metallic surface which comprises depositing between said organic substance and the inorganic oxidic or metallic substance a phosphorus organosilane of the formula

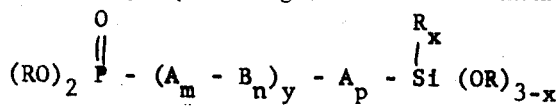

wherein each R is an independently substituted or unsubstituted aliphatic radical, each A is selected from the group consisting of alkylene radicals, arylene radicals, bivalent oxyalkylene radicals which are joined by their oxygen atom to the phosphorus atom, and bivalent oxyarylene radicals which are joined by their oxygen atom to the phosphorus atom, B is selected from the group consisting of bivalent oxygen radicals, —NH—, —NR—, and —S— when p is equal to 1 and $m$, $n$, $p$ and $x$ are each values of 0 or 1 and $y$ is equal to 1 to 20.

In accordance with this invention, laminates of organic material and substances which present either an inorganic oxidic surface or a metallic surface can be formed. These laminates are formed through the use of the above-identified phosphorus organosilanes which enable the laminates so prepared to display substantially improved mechanical strengths resulting from an improvement in the adhesion between the layers of the laminates, as indicated by measurements of wet strength and bending and traction tests on model bodies. Additionally, these laminates have the advantage that some of them have a high transparency and do not discolor even after long periods of time. The use of the phosphorus organosilanes provides such high transparency, in many cases.

It has been stated above that the phosphorus organosilanes employed pursuant to the invention are used to bond polymeric organic substances to certain metallic or inorganic substances. Organic substances which can be bonded to the metallic or inorganic substances, pursuant to the invention, include all of the known thermoplastic and thermosetting polymers, including in particular polyaddition products such as epoxy resins, urethane resins, polyester resins, polyamides, polyimides, polyacetals, polymers in the acrylic family, polymers of olefins, especially alpha and conjugated diolefins, polycondensation products, such as coldsetting and/or thermosetting phenol aldehyde resins, and polymerization products e.g., polyvinyl chloride and/or copolymers of vinyl chloride and vinyl acetate. Additionally, there are contemplated condensation products of aldehydes with phenols as above mentioned and/or with furfuryl alcohol and/or urea. Condensation products that form in the pH range above 7 as well as those that form in the pH range below 7 can be used. Particularly suitable substances to be bonded include duroplastic materials as epoxid resins, polyester resins, phenolic resins, and the like.

Examples of cold-setting resins are the condensation products that are obtained, for example, by the condensation of one mole of a phenol with 1 to 3 moles of an aldehyde in a preferably aqueous, alkaline medium, followed by distillation of the water in a vacuo down to a solid resin content of 60 to 80 percent, and adjustment of the pH to values between 4 and 8, if desired. Phenol and its monocyclic homologs, such as the cresols and resorcinol, xylenols, or mixtures of these compounds, can be used as phenols. The aldehydes reacting with the phenols include, among others, formaldehyde, compounds which decompose to formaldehyde, such as paraformaldehyde, trioxane or hexamethylenetetramine, acetaldehyde and furfurol, and mixtures of these compounds.

Furthermore, co-condensation products of furfuryl alcohol, urea, phenol in some cases, and formaldehyde, can be used as cold-setting resins. The individual components are present in the condensation in the following molar ratios:

| | |
|---|---|
| Phenols | 0.1 to 1.0 |
| Urea | 0.3 to 1.0 |
| Furfuryl alcohol | 0.1 to 1.0 |
| Formaldehyde | 2.0 to 4.0 |

The co-polycondensation of these compounds can be performed in an alkaline medium analogously to the condensation of the above-named phenol formaldehyde resins. In the copolycondensation of these compounds it has been found to be especially desirable to perform the condensation step-wise, total or partial quantities of the starting components being used in the individual steps.

As a starting component, the urea can be wholly or partially replaced by urea derivatives which are capable of reacting with aldehydes. Examples of such compounds are: thiourea, methyl and methylol urea, melamine, ammeline or benzoguanamine, and mixtures of these compounds.

Furfuryl alcohol can be replaced wholly or partially by furfurol, and formaldehyde can be replaced wholly or partially by other aldehydes already mentioned above.

Heat-setting resins which are used as binding agents for the mineral substances are mainly the resins known as novolaks. As well as some phenolic resins from the resol type. Under novolaks are to be understood to be chiefly those resins which are obtained by acid and/or alkaline condensation of aldehydes with phenols, in a ratio of phenols to aldehydes of less than 1 : 1.

The condensation is generally performed by heating the phenol with the aldehyde in, for example, an acid medium, to temperatures between 60° and 100°C and performing the condensation at this temperature for a period between 1 and 4 hours. Then the water is distilled off by vacuum distillation until the desired solid resin content is reached. The resin obtained in this manner can, after cooling and crushing, be mixed with a hardener (preferably hexamethylenetetramine) and the silane, and then it can be mixed into the mineral substance, or it is added without silane to the mineral substance to whose surface the silane has been applied, or a solution of this resin preferably in alcohol is prepared, and the silane can be added to it, and then it is mixed together with the hardener into the mineral substance.

After the mixing of the resin with the mineral substance with the addition of the silanes used according to the invention, the mixture is made into formed bodies at elevated temperature in a known manner.

Examples of components having inorganic oxidic surfaces include in particular those materials which have a silicon or aluminum or titanium to oxygen bond. Examples of these inorganic oxidic surfaces include glass, quartz, diatomaceous earth, sand, clay, asbestos, mica, corundum, iron oxides, calcium carbonate, calcium sulfate, and the like.

Suitable metal surfaces are especially iron, annealed iron, zinc, aluminum, tin and titanium. The inorganic components can be, for example, in the form of fibers, mats, rovings, powders, bats or fabrics or any other shape that presents a surface. Metals can be in the form of sheets, wires and powders as well as other particulate shapes. Of especial technical interest are glass fibers, mats, and fibrous and metal sheets which are made into laminates with a wide variety of organic polymers. Especially contemplated are sand cores containing resins such as phenolaldehyde, furfurol-aldehyde and urea-aldehyde. Also contemplated are glass fiber reinforced substances.

Particularly contemplated phosphorus organosilanes used as an adhesive substance in accordance with the present invention include the following types of phosphorus organosilanes:

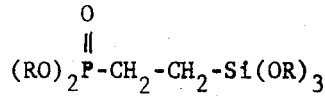

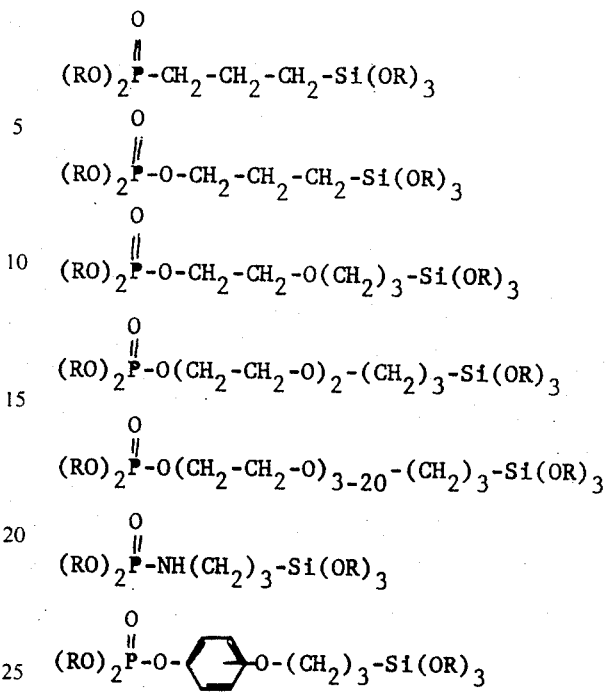

These and other phosphororganosilanes can be prepared according to the methods described in U.S. Pat. No. 3,122,581.

In the above formulae, R can be an aliphatic radical. Aliphatic radicals contemplated include alkyl, alicyclic, alkenyl of, for example, 2–8 carbon atoms, acyclic radicals of between 4 and 10 carbon atoms, radicals containing an ether function. Preferably, R is an alkyl group from 1 to 4 carbon atoms in the chain. Each R group can be the same or different and is most desirably methyl, ethyl or propyl.

The technical advantages offered by the invention can be achieved by pre-treating the inorganic substrates with the claimed phosphorus organosilanes by applying them as dressings or finishes by dipping, spraying, or brushing, for example, or by putting the phosphorus organosilane into the organic substance to serve as the adhesive adjuvant.

If the method of pre-treating the inorganic substrate is followed, they can be advantageously treated by immersion in a bath containing the phosphorus organic silicon compound. The bath will contain the dissolved adhesive phosphorus organosilane in a concentration of 0.05 to 5 percent by weight, preferably 0.1 to 2 weight percent. Alcohols, such as ethanol, isopropanol, ethers, benzines, chlorinated hydrocarbons and aromatic hydrocarbons can be used as solvents. Incombustible solvents, however, are preferred, such as water and mixtures of water with the above-named organic solvents. Where solutions of the adhesive in low concentration are used, the immersion treatment can be repeated several times in succession.

After the immersion process is completed, the impregnation with the adhesive used in accordance with the invention may be completed by evaporating the solvent away and performing a heat treatment for hardening purposes.

Following the immersion process, or any other suitable process for applying the silane solution to the surface, the solvent is evaporated. In the case of a low-boiling solvent, standing at room temperature will suffice; heat treatment up to the boiling temperatures of the solvent, however, may also be applied. This is preferred whenever a curing of the bond between the surface and the impregnating agent is to be performed simultaneously.

Generally speaking, it is desirable to coat, on the one hand, either the inorganic or metallic substance or, on the other hand, the organic substance, with a coating between about 0.1 and 0.01 $\mu$ thick of the phosphorus organosilane compound.

If the method of incorporation into the organic bonding agent is used, it will suffice to mix the phosphorus organosilicon compound into the resin by known methods so as to bring about a uniform distribution. In this case, too, adhesive concentrations of 0.05 to 5 percent, preferably 01. to 2 percent, of the weight of the resin are used. In this case another advantage of the invention over known substances, especially those containing amino groups or double bonds, is to be found in the improved shelf life of a number of mixtures of resin and adhesive, as in the case of epoxy resins, for example.

In order to more fully illustrate the nature of the invention and the manner of practicing the same, the following examples are presented:

EXAMPLE 1

A slightly acid, 2 percent hydrolyzed aqueous solution is prepared with 2-triethoxysilylethanephosphonic acid diethyl ester, and this stock solution is diluted as desired with two to five times the amount of distilled water for the treatment of glass fibers. The solution thus obtained is used for sizing glass fibers which have been desized by the application of heat. After drying at room temperature, the glass fibers are incorporated into expoxy resin rods and the resin is set at 130°C. The dry bending strength of these round rods amounts to 10,100 kg/cm$^2$, and the wet strength after moist storage is 9,500 kg/cm$^2$.

In like manner, epoxy resin rods reinforced with glass fibers were prepared, which contained $\gamma$-aminopropyltriethoxysilane as adhesive. The rods had a dry strength of only 9,400 kg/cm$^2$, and the wet strength was 9,000 kg/cm$^2$.

EXAMPLE 2

As a stock solution for the treatment of glass fabric which has previously been heat-desized, a 2 percent solution (in 40 percent water plus 60 percent ethanol) is prepared with 2-triethoxysilylethanephosphonic acid diethyl ester, and after dilution with ethanol it is used for the finishing of fabrics. The laminate prepared from this fabric displays better transparency and greater bending strength than one which has been made with the use of conventional adhesives of the prior art, including $\gamma$-aminopropyltriethoxysilane.

EXAMPLE 3

In a glass flask provided with stirrer and reflux condenser, 0.66 kg of phenol (90 percent solution) and 3.1 kg of an aqueous (37 percent) formaldehyde solution are heated with 0.74 kg of urea for 20 minutes at 100°C. After this period 1.54 kg of phenol (90 percent solution), 2.07 kg of an aqueous (37 percent) formaldehyde solution and 0.15 kg of tech. furfuryl alcohol are added in the above-named sequence. The flask contents are heated again to 100°C. Then 0.0127 kg of NaOH (100 percent), in the form of a 30 to 40 percent aqueous solution, is added drop by drop. The temperature of 100°C is sustained for 55 minutes. Then, water is removed by vacuum distillation until a viscosity of about 3,000 cP is reached.

2,000 g of Halten sand H 32 is thoroughly mixed with 50 g of the above-described resin, to which 0.2 g of adhesive has been added, together with 7.5 g of a hardener consisting of an aqueous solution of 25 weight percent ammonium nitrate and 40 weight percent urea, in a suitable positive mixer. The moist mixture is then placed in a sand core shooting machine for the preparation of the test rods. The mixture is shot with a pressure of about 7 atmospheres gauge pressure into a mold heated to 225°C. After pre-settable periods of time the mold opens automatically. The rods are removed and tested for bending strength in a +GF+ strength testing apparatus, either immediately after removal from the core shooting machine or after cooling.

The following tables give the values obtained:

Table 1

Bending strength in kp/m$^2$ (measured after cooling the hardened test rods)

| | | After a hardening time of | | | |
|---|---|---|---|---|---|
| Without adhesive | 10'' | 20'' | 30'' | 60'' | 120'' |
| a) initial | 53.0 | 72.0 | 80.0 | 81.0 | 82.5 |
| b) After 1 week | 54.0 | 71.0 | 81.0 | 81.5 | 81.0 |
| c) After 6 weeks | 39.0 | 46.0 | 70.0 | 72.5 | 69.0 |
| With adhesive A | | | | | |
| a) Initial | 56.0 | 75.0 | 83.0 | 83.5 | 83.0 |
| b) After 1 week | 57.0 | 77.5 | 82.0 | 82.5 | 84.0 |
| c) After 6 weeks | 38.0 | 47.0 | 64.0 | 69.5 | 71.5 |
| With adhesive B | | | | | |
| a) Initial | 53.5 | 78.0 | 86.5 | 86.0 | 81.0 |
| b) After 1 week | 54.0 | 76.5 | 85.0 | 87.5 | 83.5 |
| c) After 6 weeks | 37.0 | 47.0 | 62.5 | 66.0 | 69.5 |

Table 2

Bending strength in kp/m$^2$ (measured immediately after removal from the core shooting machine)

| | | | After a hardening time of | | | |
|---|---|---|---|---|---|---|
| Without adhesive | 5'' | 10'' | 20'' | 30'' | 60'' | 120'' |
| a) Initial | 13.0 | 21.0 | 25.0 | 35.0 | 54.0 | 57.0 |
| b) After 1 week | 12.0 | 22.0 | 26.0 | 36.0 | 51.0 | 55.5 |
| c) After 6 weeks | — | 12.0 | 19.5 | 30.5 | 33.0 | 44.0 |
| With adhesive A | | | | | | |
| a) Initial | 15.0 | 25.0 | 37.0 | 44.0 | 49.5 | 58.0 |
| b) After 1 week | 14.5 | 21.5 | 33.5 | 43.0 | 49.0 | 57.5 |
| c) After 6 weeks | 6.0 | 14.0 | 22.5 | 31.0 | 36.5 | 44.5 |
| With adhesive B | | | | | | |
| a) Initial | 17.0 | 26.0 | 41.0 | 49.0 | 54.0 | 59.0 |
| b) After 1 week | 17.0 | 27.5 | 39.0 | 50.5 | 52.5 | 56.0 |
| c) After 6 weeks | 7.5 | 10.0 | 30.0 | 38.0 | 39.0 | 41.0 |

In the above tables,

Adhesive A is a mixture of 75 percent γ-aminopropyltriethoxysilane and 25 percent α-methyl-β-aminoethyltriethoxysilane.

Adhesive B is triethoxysilylethanephosphonic acid diethyl ester.

Initial: the prepared resin is immediately mixed with the sand and made into the test rods.

After 1(6) Weeks: The prepared resin is mixed with the same after a storage period of 1 (or 6) weeks and then made into test rods.

The tables show, among other things, that the addition of the phosphorus-containing silanes improves the hot bending strength of the test rods by 10 percent as compared with prior art additives. This results in a substantial improvement in the mold stripping ability of the foundry sands made therewith.

EXAMPLE 4

A cold-setting resin is prepared by first heating 164.5 g of phenol (100 percent), 1200 g of formaldehyde (37 percent solution) and 420 g of urea for 15 minutes at 100°C. Then 844 g of formaldehyde (37 percent solution), 500 g of furfuryl alcohol and 4 g of sodium carbonate are added and condensed for another 75 minutes at 100°C. Then the water is distilled in vacuo until the viscosity is brought to about 1,500 cP. The solid resin content amounts to about 60 percent.

2.0 g of this resin is mixed with 100 g of H 32 Haltern sand, 0.33 g of a 70 percent aqueous solution of $H_3PO_4$ as hardener, and an amount of 2-triethoxysilylethanephosphonic acid diethyl ester in an amount equivalent to about 0.2 weight percent based upon the weight of the resin. The same is formed into a test stick which has improved strength values and demonstrates improved mold stripping ability.

EXAMPLE 5

A plate of aluminium, previously degreased with acetone, was dipped in a 1 percent solution of $(C_2H_5O)_2-P-O-CH_2-CH_2-CH_2-Si-(OC_2H_5)_3$ in isopropanol for a short time and then dried for 5 minutes at a temperature of 120°C. The thus treated plate was then coated with a heat setting polyurethane resin. After setting of the resin the sample was tested by the method of grid - scoring according to DIN 53 157. The resulting strength of adhesion was 100 percent better than without a pretreatment with the silane.

EXAMPLE 6

A glass plate, degreased with a solvent, was treated with an 1 percent solution of a 1:1 mixture of γ-methacryloxipropyltrimethoxisilane and $(C_2H_5O)_2-P-O(CH_2-CH_2O)_2-(CH_2)_3Si(OC_2H_5)_3$ in siopropanol and afterwards dried. The thus treated glass plate was then coated with an unsaturated polyester resin. After setting of the resin and deposing of he plate in a humid atmosphere for 2 days, the strength of adhesion was treated by the method of grid-scoring. Compared with a sample, analogously treated only with γ-methacryloxipropyltrimethoxisilane, the strength of adhesion was 50 percent better.

EXAMPLE 7

A 1:1 mixture of γ-methacryloxipropyltrimethoxisilane and $(C_2H_5-O)_2PNH (CH_2)_3 Si(OC_2H_5)_3$ is dissolved in water, slightly acified with acetic acid in such a quantity to obtain a 0.5 percent solution. Glass fibers, desized by the application of heat was treated with this solution and dried at a temperature of 130°C. The thuse treated glass fibers were incorporated in a polyester resin and test rods were formed, which were set at 130°C. The bending strength of this rods was 10 776 kp/cm² and 8 115 kp/cm² after storing in water for 72 hours. A sample for comparison purposes was treated analogously with the exeption that only γ-methacryloxipropyltrimethoxisilane was taken as adhesive. This sampel gave immediately after setting a bending strength of 10 560 kp/cm²; this vaoue dropped down to 7 200 kp/cm² after storage in water for 72 hours.

What is claimed is:

1. A composite article comprising a polymeric organic substance and an inorganic oxidic surface or metallic surface, said composite having at the interface between the metal or oxidic surface and the organic substance a phosphorus organosilane of the formula

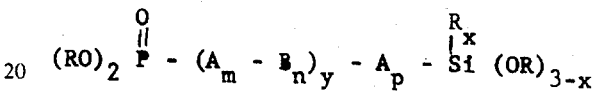

wherein $m, n, p, x$ are 0 or 1; $y$ is 1 to 20; R is independently a substituted or unsubstituted aliphatic radical; A is independently a bivalent alkylene group, a bivalent arylene group, a bivalent oxyalkylene group joined by its oxygen atom to the phosphorus atom or a bivalent oxyarylene group joined by its oxygen atom to the phosphorus atom; and B is a radical selected from the group consisting of a bivalent oxygen radical, an —NH—radical, an —NR— radical and an —S— radical, when p is equal to 1.

2. A composite according to claim 1 wherein the phosporus organosilane disposed at the interface between the organic substance and the inorganic oxidic or metallic substance is selected from the group consisting of

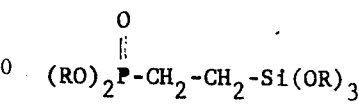

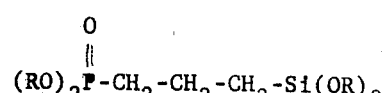

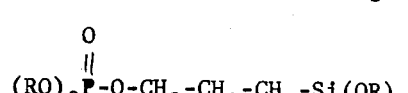

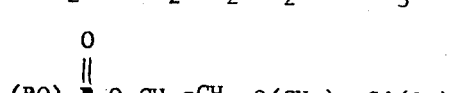

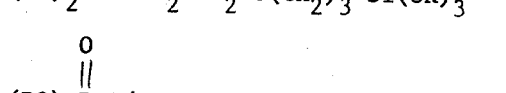

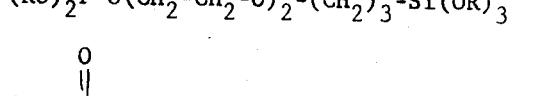

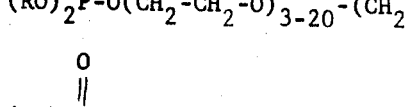 and

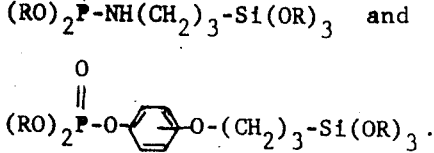

3. A composite article according to claim 2 wherein the amount of phohsphorus organosilane disposed at the interface forms a coating which is between 0.1 and $0.01\beta$ thick.

4. A composite article according to claim 1 wherein the phosphorus organosilane is present in the polymeric organic substance in an amount between 0.05 and 5 percent, based upon the weight of the polymeric organic substance.

5. A composite article accordin to claim 1 wherein the polymeric organic substance is bonded to an inorganic oxidic surface which inorganic oxidic surface has a silicon, aluminum or titanium to oxygen bond.

6. A composite article according to claim 1 wherein the polymeric organic surface is bonded to a metallic surface which metallic surface is a metal of iron, annealed iron, zinc, aluminum, tin or titanium.

* * * * *